(12) United States Patent
Seo et al.

(10) Patent No.: US 12,341,146 B2
(45) Date of Patent: Jun. 24, 2025

(54) APPARATUS AND METHOD FOR MANUFACTURING RECHARGEABLE BATTERY CASE

(71) Applicant: SANGSINEDP CO., LTD., Cheonan-si (KR)

(72) Inventors: Su Young Seo, Cheonan-si (KR); Byeong Cheol Min, Cheonan-si (KR); Jung Hun Min, Cheonan-si (KR)

(73) Assignee: SANGSINEDP CO., LTD., Cheonan-si (KR)

( * ) Notice: Subject to any disclaimer, the term of this patent is extended or adjusted under 35 U.S.C. 154(b) by 0 days.

(21) Appl. No.: 18/898,699

(22) Filed: Sep. 27, 2024

(65) Prior Publication Data
US 2025/0023086 A1    Jan. 16, 2025

Related U.S. Application Data

(63) Continuation of application No. PCT/KR2023/007551, filed on Jun. 1, 2023.

(30) Foreign Application Priority Data

Jun. 13, 2022 (KR) .......................... 10-2022-0071289

(51) Int. Cl.
*B21D 22/21* (2006.01)
*B21D 28/14* (2006.01)
(Continued)

(52) U.S. Cl.
CPC ........ *H01M 10/0404* (2013.01); *B21D 22/21* (2013.01); *B21D 28/14* (2013.01); *B21D 28/18* (2013.01); *B21D 45/02* (2013.01)

(58) Field of Classification Search
CPC ........ B21D 22/21; B21D 22/26; B21D 22/28; B21D 45/02; B21D 45/04; H01M 50/119
See application file for complete search history.

(56) References Cited

U.S. PATENT DOCUMENTS

| 2019/0022730 A1* | 1/2019 | Dunwoody | ............ B21D 51/34 |
| 2023/0124823 A1* | 4/2023 | Fukunaga | ............. B21D 51/52 |
| | | | 29/623.1 |

FOREIGN PATENT DOCUMENTS

| JP | 2016132011 | 7/2016 |
| KR | 10-2013-0118715 | 10/2013 |

(Continued)

OTHER PUBLICATIONS

International Search Report dated Sep. 14, 2023, issued in PCT International Application No. PCT/KR2023/007551.

*Primary Examiner* — Debra M Sullivan
(74) *Attorney, Agent, or Firm* — PnK IP LLC

(57) ABSTRACT

The present invention relates to an apparatus for manufacturing a rechargeable battery case, the apparatus comprising: a punch which presses an object; a die which comprises an extrusion part for extruding the pressed object, wherein, when the punch presses the object such that the object enters the extrusion part, the die is elastically deformed so that the width of the extrusion part is increased, and when the punch continues to press the object such that the object is separated from the extrusion part, the die is elastically deformed so that the width of the extrusion part is restored to an initial value; and a knockout unit which is raised through the extrusion part of the die, has the object seated thereon, raises or lowers the object, and raises the object when the object interferes with the die such that the punch and the object are separated from each other.

11 Claims, 9 Drawing Sheets

(51) Int. Cl.
*B21D 28/18* (2006.01)
*H01M 10/04* (2006.01)
*B21D 45/02* (2006.01)

(56) References Cited

FOREIGN PATENT DOCUMENTS

| | | |
|---|---|---|
| KR | 10-2014-0019933 | 2/2014 |
| KR | 10-1461445 | 11/2014 |
| KR | 10-2019-0061572 | 6/2019 |
| KR | 10-2446928 | 9/2022 |

* cited by examiner

APPARATUS AND METHOD FOR MANUFACTURING RECHARGEABLE BATTERY CASE

CROSS REFERENCE TO RELATED APPLICATIONS

This application is a Bypass Continuation of International Patent Application No. PCT/KR2023/007551, filed on Jun. 1, 2023, which claims priority from and the benefit of Korean Patent Application No. 10-2022-0071289, filed on Jun. 13, 2022, each of which is hereby incorporated by reference for all purposes as if fully set forth herein.

BACKGROUND

Field

Embodiments of the invention relate generally to an apparatus and a method for manufacturing a rechargeable battery case, and more specifically, to an apparatus and a method for manufacturing a rechargeable battery case capable of manufacturing a case that is used in manufacturing a rechargeable battery.

Discussion of Background

A rechargeable battery is a battery that can be charged and discharged, as opposed to a primary battery that cannot be charged. A small-capacity rechargeable battery has been used in a portable small electronic device, such as a cellular phone, a notebook computer, or a camcorder, and a large-capacity battery has been widely used as a power source for driving a motor of an electric vehicle or the like.

A battery module has been manufactured in various forms, and a medium and large battery module is formed by connecting a plurality of high-power battery cells in series and storing the connected battery cells in a rechargeable battery case so that the battery module can be used to drive a device that requires a large power, for example, to drive a motor of an electric vehicle or the like. Such a case is made of aluminum in order to effectively cool the heat of the battery cells or to lighten the battery cells.

Generally, such a rechargeable battery case is manufactured by using a deep drawing method. According to the existing deep drawing method, a primary drawing process in which an object passes the die downward while being processed by a punch and a secondary drawing process in which the object then passes the die again and is ejected upward in a state where the punch is inserted into the object are in progress. However, as the secondary drawing process is additionally performed after the primary drawing process, unexpected shape deformation occurs in the object, and this causes a problem in that the quality of the rechargeable battery case as the final product deteriorates.

The above information disclosed in this Background section is only for understanding of the background of the inventive concepts, and, therefore, it may contain information that does not constitute prior art.

SUMMARY

An object of the present invention invented to solve the above problem is to provide an apparatus and a method for manufacturing a rechargeable battery case capable of preventing an unexpected shape deformation of an object in a manufacturing process.

According to an embodiment of the present invention, an apparatus for manufacturing a rechargeable battery case may include: a punch configured to press an object; a die including an extrusion portion configured to extrude the object being pressed, the die being configured to be elastically deformed so that a width of the extrusion portion is increased when the punch presses the object such that the object enters the extrusion portion, and being configured to be elastically deformed so that the width of the extrusion portion is restored to an initial value when the punch continues to press the object such that the object secedes from the extrusion portion; and a knockout unit configured to be raised or lowered through the extrusion portion of the die, to seat the object thereon, to raise or lower the object, and to raise the object when the punch and the object are separated from each other by interference of the object with the die.

Further, the die may include: a base portion having the extrusion portion formed to penetrate in up and down directions; a guide portion formed to be rounded on an upper side of a portion where the extrusion portion is located on the base portion and configured to guide the object to the extrusion portion; and a catching portion formed to be inclined on a lower side of a portion where the extrusion portion is located on the base portion and configured to restrict the object from moving to the extrusion portion when an external force over a specific magnitude is not applied to the object in a state where the catching portion comes in contact with an upper end of the object.

Further, the catching portion may be formed to have an angle within a range of 70 to 80 degrees with respect to a transverse direction of the base portion.

Further, a width P of the punch, a thickness T of the object that is drawn through the extrusion portion, and an initial value D1 of the width of the extrusion portion may satisfy a mathematical expression below:

$$D1 < P + (T \times 2).$$

Further, a difference between a value D2 when the width of the extrusion portion is increased to a maximum and an initial value D1 of the width may be within a range of 0.1 to 0.5 mm.

Further, the apparatus may further include: a frame to which the die is coupled; a driving unit configured to move the punch in up and down directions; and a controller configured to control operations of the knockout unit and the driving unit.

Further, the apparatus may further include: an upper plate coupled to an upper portion of the die; and a lower plate coupled to a lower portion of the die and coupled to the frame.

Further, the controller may be configured to lower the punch until an upper end of the object comes in contact with the catching portion of the die.

Further, the controller may be configured to control the knockout unit so that the object is raised after stopping an operation of the knockout unit for a reference time, while controlling the driving unit so that the punch is raised in a state where an upper end of the object comes in contact with the catching portion of the die.

Further, the reference time may be within a range of 1.0 to 1.5 seconds.

According to an embodiment of the present invention, an apparatus for manufacturing a rechargeable battery case, which performs a drawing process at least once on an object having a three-dimensional shape with an open top to manufacture the rechargeable battery case, the apparatus may include: a punch; a die provided with an extrusion portion and a catching portion formed to be inclined on a lower side of the extrusion portion; and a knockout unit on which the object is seated in a state where the knockout unit is raised to the extrusion portion, wherein the punch is lowered together with the knockout unit in a state where the punch is inserted inside the object such that the object passes through the extrusion portion and comes in contact with the catching portion, and then the punch is raised again alone in a state where the knockout unit is fixed such that the punch is separated from the object by the catching portion, and wherein the knockout unit is elevated after the punch and the object are separated from each other such that the knockout unit ejects the object upward through the extrusion portion.

According to an embodiment of the present invention, a method for manufacturing a rechargeable battery case, which performs a drawing process at least once on an object having a three-dimensional shape with an open top to manufacture the rechargeable battery case, the method may include: positioning the object on a knockout unit that is disposed on an extrusion portion of a die by a transport unit; locating the object so that the object passes through the extrusion portion and comes in contact with a catching portion formed to be inclined on a lower side of the extrusion portion by inserting a punch inside the object and lowering the punch and the knockout unit together; separating the punch from the object that is fixed by the catching portion by raising the punch; and moving the object upwardly through the extrusion portion by elevating the knockout unit.

According to the present invention as described above, it is possible to provide an apparatus and a method for manufacturing a rechargeable battery case, which may improve the manufacturing reliability.

It is to be understood that both the foregoing general description and the following detailed description are illustrative and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the inventive concepts.

DETAILED DESCRIPTION

Figure 1:
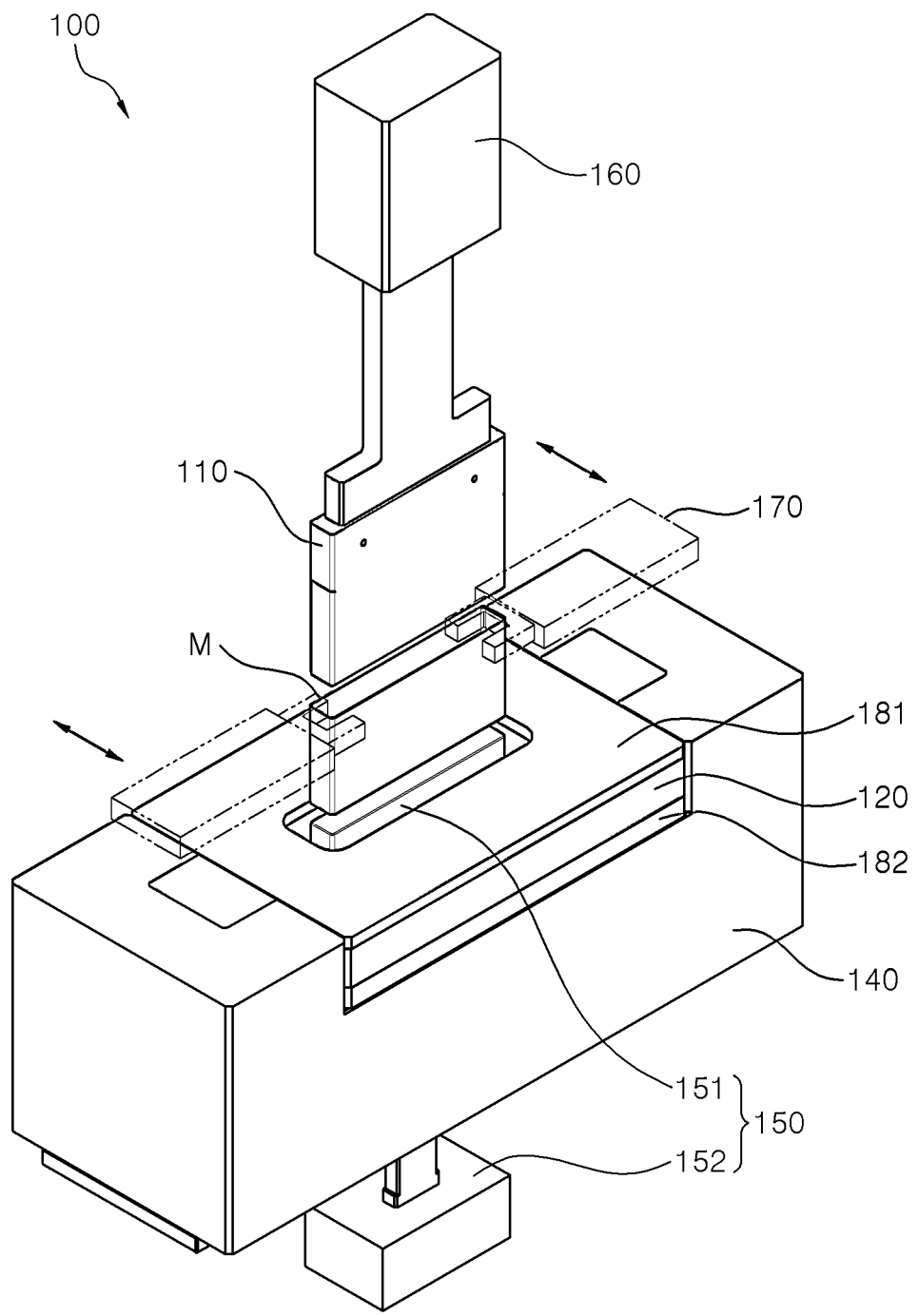
FIG. 1 is a perspective view illustrating an apparatus for manufacturing a rechargeable battery case according to an embodiment of the present invention.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are shown in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of idealized embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the inventive concepts. Further, the blocks, units, and/or modules of some embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 2:
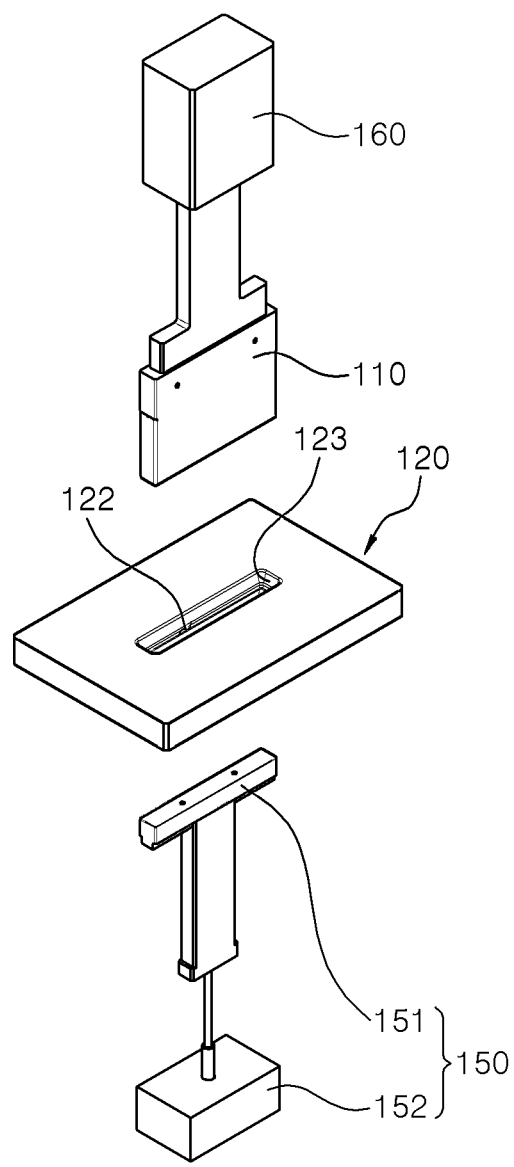
FIG. 2 is an exploded perspective view illustrating a punch, a die, and a knockout unit taken from the apparatus for manufacturing a rechargeable battery case of FIG. 1.
Figure 3:
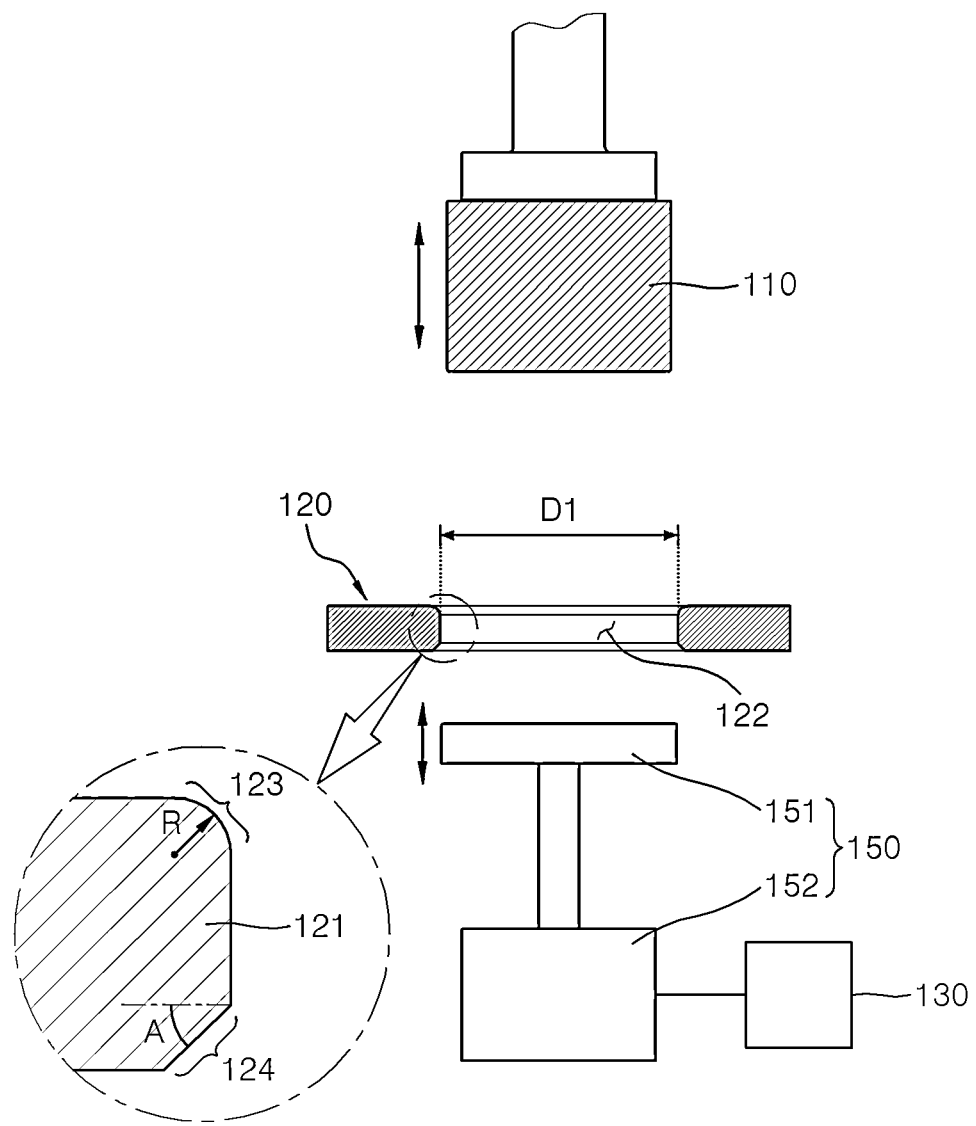
FIG. 3 is a vertical cross-sectional view illustrating the apparatus for manufacturing a rechargeable battery case of FIG. 1.

FIG. 1 is a perspective view illustrating an apparatus for manufacturing a rechargeable battery case according to an embodiment of the present invention, FIG. 2 is an exploded perspective view illustrating a punch, a die, and a knockout unit taken from the apparatus for manufacturing a rechargeable battery case of FIG. 1, and FIG. 3 is a vertical cross-sectional view illustrating the apparatus for manufacturing a rechargeable battery case of FIG. 1.

Referring to FIGS. 1 to 3, an apparatus 100 for manufacturing a rechargeable battery case according to an embodiment of the present invention may include a punch 110, a die 120, and a knockout unit 150.

The punch 110 may press an object M. The punch 110 may be in the form of a bar. The punch 110 may be located above the die 120 to be described later, and may be lowered or raised toward the object M.

In a general deep drawing process, the object M may be continuously extruded through several steps. For example, even before the object M is processed by the apparatus 100 for manufacturing a rechargeable battery case according to an embodiment of the present invention, a process for drawing the object M at least once may be carried out, and in this case, the processed object M may be in a three-dimensional shape (e.g., hexahedron) with an open top. The apparatus 100 for manufacturing a rechargeable battery case according to an embodiment of the present invention may be an apparatus that manufactures a rechargeable battery case by finally extruding the object M that has been extruded at least once.

Meanwhile, the apparatus 100 for manufacturing a rechargeable battery case according to an embodiment of the present invention may include a transport unit 170. The transport unit 170 may transport the object M processed in the process to a next process. For example, the transport unit 170 may be provided as a pair and designed to grip opposite side surfaces of the object M, and may move the object M from a previous process to a next process while being reciprocated at predetermined intervals.

The die 120 extrudes the object M that is pressed by the punch 110. For this purpose, the die 120 may include an extrusion portion 122 that extrudes the object M being processed. For example, the extrusion portion 122 may be defined as an open area that is formed within the die 120, and the size and the shape of the extrusion portion 122 may be designed to fit a target shape of the rechargeable battery case to be manufactured. The object M may be manufactured into the target shape as being pressed by the punch 110 and being extruded through the extrusion portion 122.

In the apparatus 100 for manufacturing a rechargeable battery case according to an embodiment of the present invention, when the punch 110 presses the object M such that the object M enters the extrusion portion 122, the die 120 may be elastically deformed so that a width of the extrusion portion 122 is increased. And as the punch 110 continues to press the object M such that the object M is disengaged from the extrusion portion 122, the die 120 may be elastically deformed so that the width of the extrusion portion 122 is restored to an initial value.

For this purpose, for example, the die 120 may include a base portion 121, a guide portion 123, and a catching portion 124.

The base portion 121 may be the body of the die 120. As an example, the base portion 121 may be in the form of a block. The extrusion portion 122 described above may have a shape that penetrates the base portion 121 in up and down directions so that the object M that is pressed by the punch 110 is inserted therein.

The guide portion 123 may be formed to be rounded at an upper side of the portion where the extrusion portion 122 is located on the base portion 121, and may guide the object M to the extrusion portion 122. The shapes of the guide portion 123 and the extrusion portion 122 may be designed to fit the target shape of the rechargeable battery case to be manufactured.

The object M may be manufactured into the target shape as being pressed by the punch 110 and being extruded through the guide portion 123 and the extrusion portion 122. For this purpose, the radius of curvature R of the guide portion 123 may be changed in accordance with the design of the rechargeable battery case, and thus is not limited to a specific value.

The catching portion 124 may be formed to be inclined at a lower side of the portion where the extrusion portion 122 is disposed in the base portion 121. Unless an external force greater than or equal to a certain magnitude is applied to the object M in a state where the catching portion 124 comes in contact with an upper end of the object M, the catching portion 124 may restrict the object M from moving to the extrusion portion 122. That is, if the external force greater than or equal to the certain magnitude is applied to the object M by the knockout unit 150 to be described later, the object M may enter the extrusion portion 122.

For this purpose, the catching portion 124 may be formed to have an angle A within the range of 70 to 80 degrees with respect to a transverse direction (left and right directions or horizontal direction) of the base portion 121.

If the catching portion 124 has an inclined surface less than 70 degrees with respect to the transverse direction of the base portion 121, the object M maintains a state of being caught by the catching portion 124, and may not be naturally disengaged from the catching portion 124 in the process in which the object M is raised by the knockout unit 150, causing the object M to be damaged. And if the catching portion 124 has an inclined surface exceeding 80 degrees with respect to the transverse direction of the base portion 121, the object M is unable to maintain the state of being caught by the catching portion 124 and may be raised together with the punch 110.

However, since the catching portion 124 is formed to have the angle A within the range of 70 to 80 degrees with respect to the transverse direction of the base portion 121, not only the object M may be naturally separated from the punch 110 by the catching portion 124 when the punch 110 is raised, but also the object M may naturally enter the extrusion portion M as the knockout unit 150 is raised after the punch 110 is separated from the object M.

The knockout unit 150 is elevated through the extrusion portion 122 of the die 120. The object M may be seated on the knockout unit 150 in a state where the knockout unit 150 is elevated to the extrusion portion 122. The knockout unit 150 may raise or lower the object M. When the punch 110 and the object M are separated from each other by the interference of the object M with the die 120, the knockout unit 150 may raise the object M.

For this purpose, the knockout unit 150 may include, as an example, a support plate 151 and an actuator 152. The support plate 151 may be formed into a shape that may be accommodated in the extrusion portion 122 of the die 120. The actuator 152 is coupled to a lower side of the support plate 151 and raises or lowers the support plate 151. As an example, the actuator 152 may be a hydraulic cylinder, a pneumatic cylinder, a rack and a pinion gear, or a worm and a worm gear, but is not limited thereto.

The operations of the knockout unit 150 and the punch 110 as above will be described again. The punch 110 may be lowered together with the knockout unit 150 in a state of being inserted inside the object M. Accordingly, the punch 110 makes the object M pass through the extrusion portion 122 and come in contact with the catching portion 124, and then the punch 110 is raised back alone in a state where the knockout unit 150 is fixed, allowing the punch 110 to be separated from the object M by means of the catching portion 124.

Further, the knockout unit 150 may be elevated after the punch 110 and the object M are separated from each other, and thus the knockout unit 150 may eject the object M upward through the extrusion portion 122.

In the apparatus for manufacturing a rechargeable battery case in the related art, as the punch is lowered and then is raised, the object is raised together with the punch and is subjected to the drawing process again, thus undergoing additional deformation caused by friction between the punch and the die. On the contrary, in the apparatus 100 for manufacturing a rechargeable battery case according to an embodiment of the present invention as described above, when the punch 110 is raised after the primary drawing process, the object M is automatically separated from the punch 110 by means of the catching portion 124, and thus only the punch 110 in a state where the object M is removed therefrom may pass through the extrusion portion 122 and may move upward. Thereafter, the object M that has been separated from the punch 110 may maintain the state of being caught by the catching portion 124 for a predetermined time, and then may be discharged upwardly from the die 120 by the rising operation of the knockout unit 150. That is, when following the above-described manufacturing process, the secondary drawing process that is performed by the punch 110 may be removed, and thus the additional deformation of the object M may be prevented.

As the material of the object M, it is common to use a material which has a softness and which may be elastically restored against slight deformation, and even when being slightly pressed by the die 120, the object M may be restored to the original shape after being discharged from the die 120. That is, in the apparatus 100 for manufacturing a rechargeable battery case according to an embodiment of the present invention, unlike the apparatus in the related art, the object M is not raised together with the punch 110 and is not subjected to the drawing again, and thus the object M may be manufactured into a case that corresponds to the target shape without being deformed.

For this purpose, the apparatus 100 for manufacturing a rechargeable battery case according to an embodiment of the present invention will be described in detail. A width P of the punch 110, a thickness T of the object M that is drawn through the extrusion portion 122, and an initial value D1 of the width of the extrusion portion 122 may satisfy a mathematical expression below:

$$D1 < P + (T \times 2). \qquad \text{[Mathematical expression 1]}$$

Here, the initial value D1 of the width of the extrusion portion 122 is the width (width in the left and right directions based on being illustrated in the drawing) of the extrusion portion 122 in a state where the punch 110 and the object M do not pass through the extrusion portion 122. As described in the above mathematical expression 1, the initial value D1 of the width of the extrusion portion 122 may be a value that is smaller than the sum of double the thickness T of the object M drawn as passing through the extrusion portion 122 and the width P of the punch 110.

In the process in which the object M is pressed by the punch 110 and is extruded by the extrusion portion 122, the thickness of an inner wall of the object M may be reduced while the object M is pressed by the punch 110 and the die 120, and thus the thickness of the object M may be changed to a design target value (e.g., T). In this case, the width of the extrusion portion 122 may be somewhat increased from D1 to D2.

Accordingly, the thickness of the drawn object M is changed to the target value T, and as the above mathematical expression 1 is satisfied, the object M is unable to pass through the extrusion portion 122 and maintains the state of being caught by the catching portion 124 even if the punch 110 is raised.

Meanwhile, the difference between the value D2 when the width of the extrusion portion 122 is increased to a maximum and the initial value D1 of the width may be within the range of 0.1 to 0.5 mm.

Unlike the above, if the difference between the values D2 and D1 is less than 0.1 mm, the die 120 is rarely deformed and an excessive pressure is applied to the object M, so that the thickness of the inner wall of the object M may be excessively reduced than the design value. Furthermore, it may be difficult for the punch 110 and the object M to pass through the extrusion portion 122 of the die 120.

And if the difference between the values D2 and D1 exceeds 0.5 mm, the die 120 is excessively deformed and insufficient pressure is applied to the object M, so that it may be difficult to reduce the thickness of the inner wall of the object M to the design value.

However, since the difference between the values D2 and D1 is within the range of 0.1 to 0.5 mm, the inner wall of the object M may be properly pressed, and thus the object M may be manufactured into the design value.

Meanwhile, the apparatus 100 for manufacturing a rechargeable battery case according to an embodiment of the present invention will be described in more detail. The apparatus 100 for manufacturing a rechargeable battery case according to an embodiment of the present invention may include a frame 140, a driving unit 160, and a controller 130.

The frame 140 may be coupled to the die 120. The frame 140 may be installed on the ground or work area. The above-described knockout unit 150 may be installed on a lower portion of the frame 140.

The driving unit 160 may move the punch 110 in up and down directions. The driving unit 160 may be coupled to an upper side of the punch 110. The driving unit 160 may lower the punch 110 to the object M, or may raise the punch 110 after the object M is extruded. It may be possible that the driving unit 160 is directly coupled to the punch 110 or is indirectly coupled to the punch 110 by a holder (not shown) of the punch 110.

The controller 130 may control the operations of the knockout unit 150 and the driving unit 160. The controller 130 may raise the support plate 151 by operating the actuator 152 of the knockout unit 150, and may move the punch 110 in up and down directions by operating the driving unit 160. For this purpose, the controller 130 may include a microprocessor that controls the overall operation of the apparatus 100 for manufacturing a rechargeable battery case according to an embodiment of the present invention.

Meanwhile, the apparatus 100 for manufacturing a rechargeable battery case according to an embodiment of the present invention may further include an upper plate 181 and a lower plate 182.

The upper plate 181 may be coupled to an upper portion of the die 120. In the upper plate 181, a portion that corresponds to the extrusion portion 122 of the die 120 may be penetrated with a size that is relatively larger than the size of the object M so that the portion does not interfere with the object M.

The lower plate 182 may be coupled to the lower portion of the die 120 and may be coupled to the frame 140. By means of the lower plate 182, the die 120 may be stably fixed to the frame 140. Here, the lower plate 182 and the upper plate 181 may be fastened to die 120 by a bolt for later separation from the die 120.

Meanwhile, unlike the above, in the apparatus for manufacturing a rechargeable battery case, in which the upper plate, the die, and the lower plate are made in one piece, if a change in shape of the rechargeable battery case to be manufactured is required, all of the upper plate, the die, and the lower plate should be replaced, and thus a lot of cost may be required.

However, in the apparatus 100 for manufacturing a rechargeable battery case according to an embodiment of the present invention as described above, the upper plate 181 and the lower plate 182 are coupled to the upper and lower portions of the die 120 in a separable manner, and if the die 120 is damaged or worn out due to the repeated use, it is possible to replace only the die 120 and use the apparatus 100. Furthermore, if a change in shape of the rechargeable battery case to be manufactured is required, it is also possible to remove the existing die 120 and to install and use the die 120 of a different shape.

Hereinafter, a method for manufacturing a rechargeable battery case using the apparatus 100 for manufacturing a rechargeable battery case according to an embodiment of the present invention will be described in detail with reference to the drawings.

Figure 4:
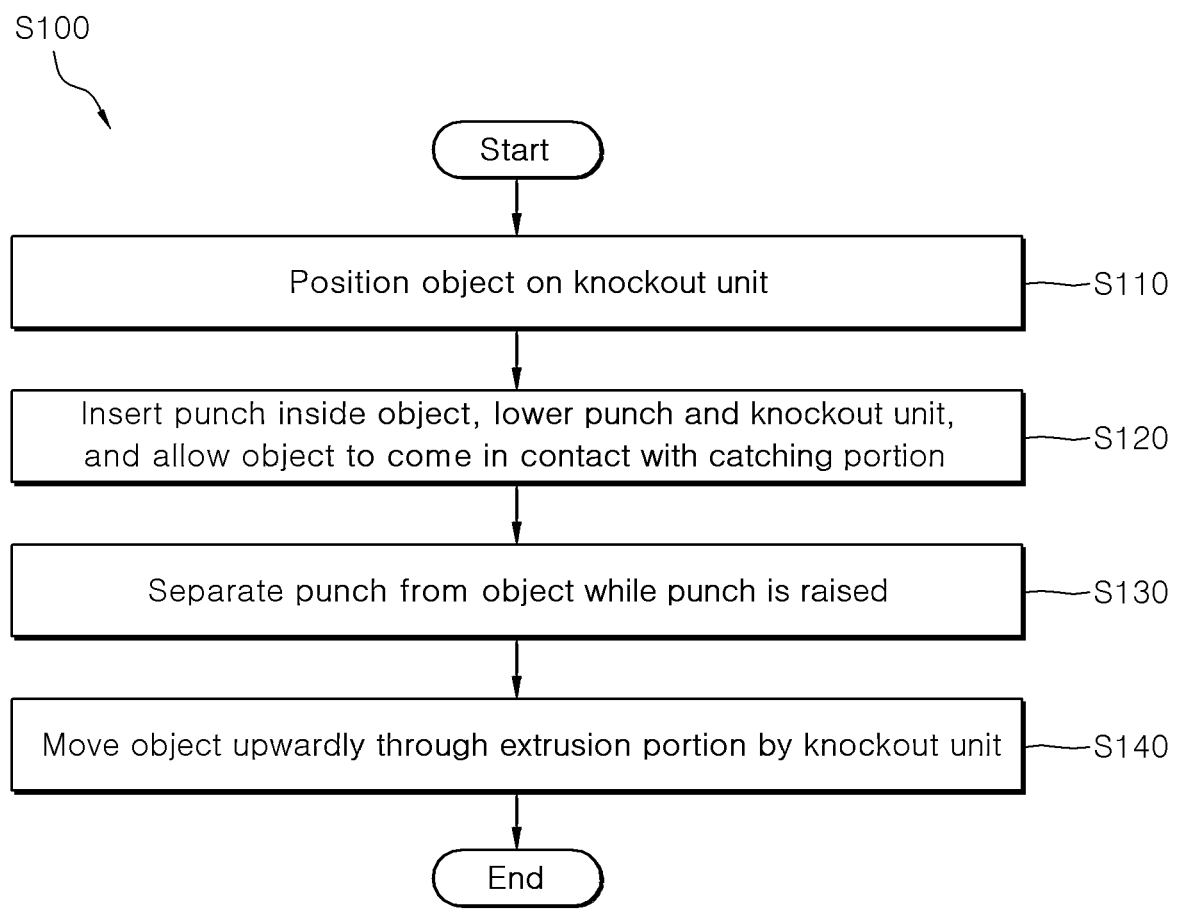
FIG. 4 is a flowchart illustrating a method for manufacturing a rechargeable battery case according to an embodiment of the present invention.

FIG. 4 is a flowchart illustrating a method for manufacturing a rechargeable battery case according to an embodiment of the present invention.

Referring to FIG. 4, a method S100 for manufacturing a rechargeable battery case according to an embodiment of the present invention may include: positioning an object on a knockout unit that is located on an extrusion portion of a die by a transport unit (S110); locating the object so that the object passes through the extrusion portion and comes in contact with a catching portion formed to be inclined on a lower side of the extrusion portion by inserting a punch inside the object and lowering the punch and the knockout unit together (S120); separating the punch from the object that is fixed by the catching portion when raising the punch (S130); and moving the object upwardly through the extrusion portion by elevating the knockout unit (S140).

Figure 5:
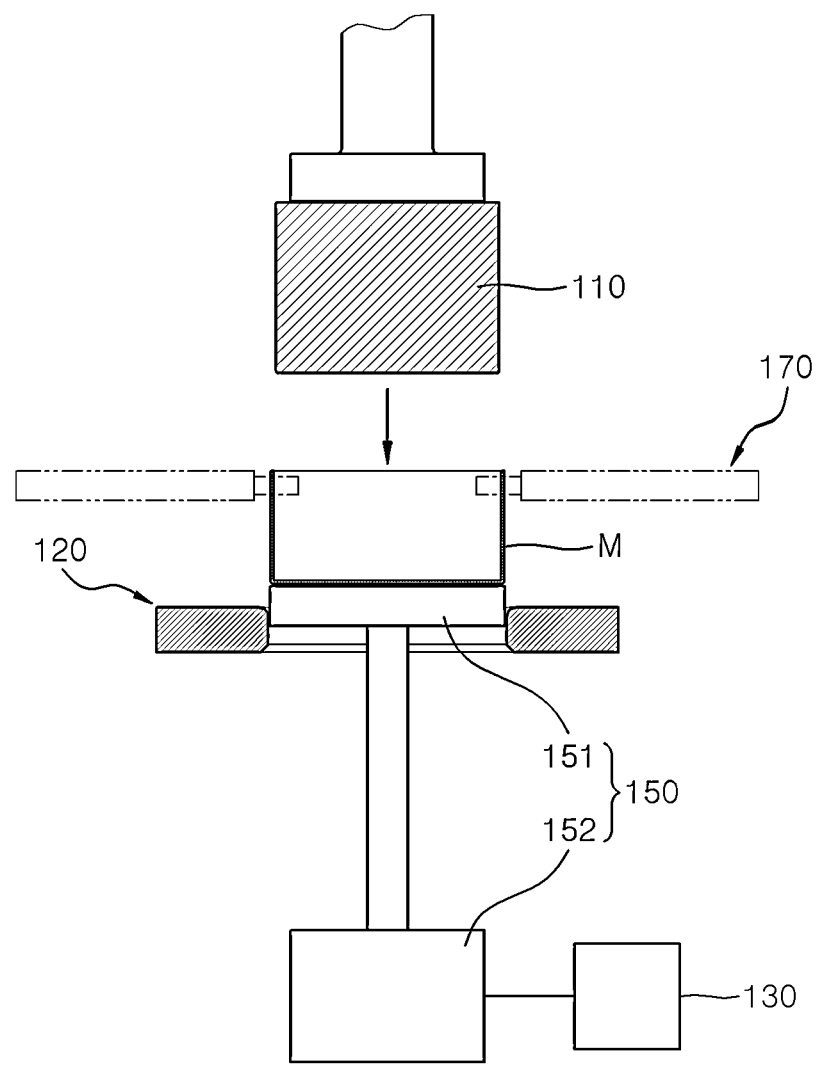
FIGS. 5 to 9 are views illustrating steps of a method for manufacturing a rechargeable battery case according to an embodiment of the present invention.
Figure 6:
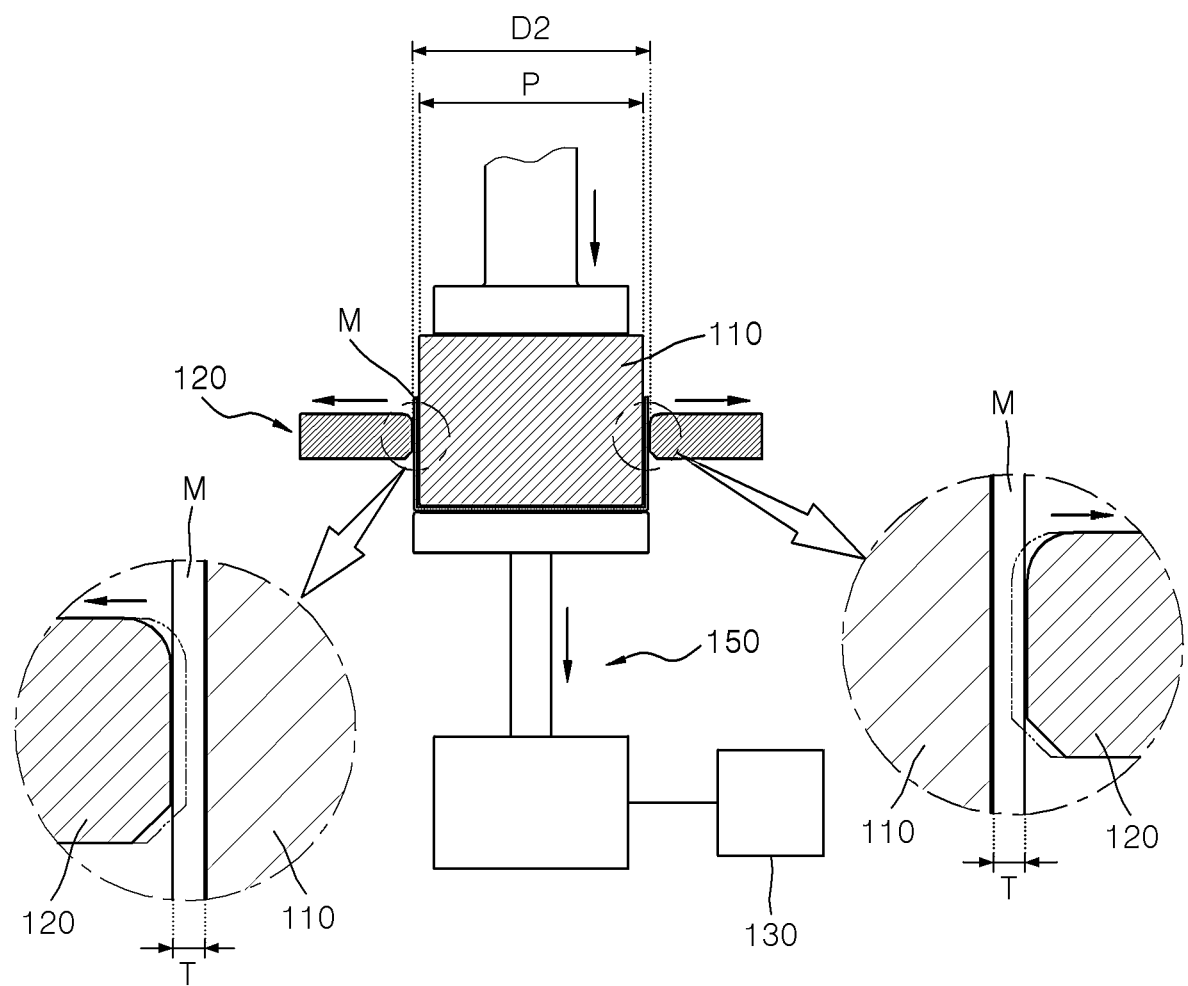
Figure 7:
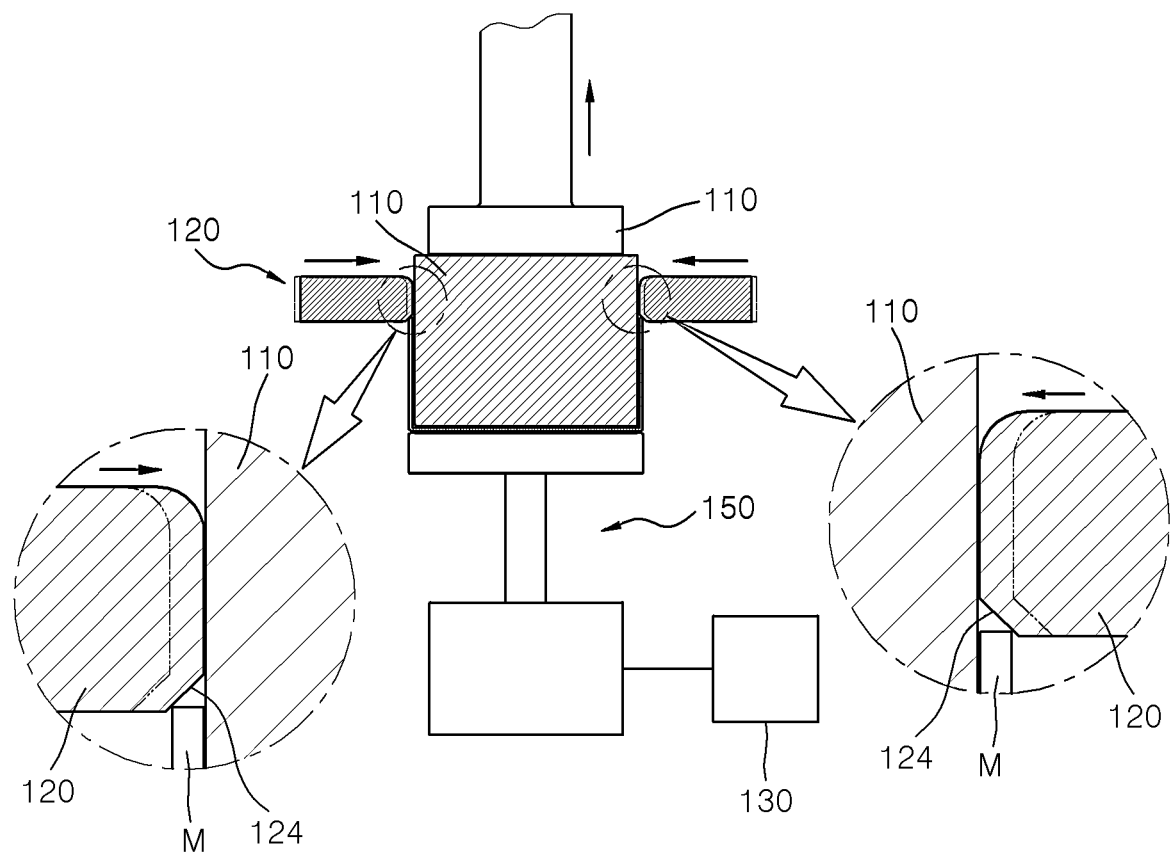
Figure 8:
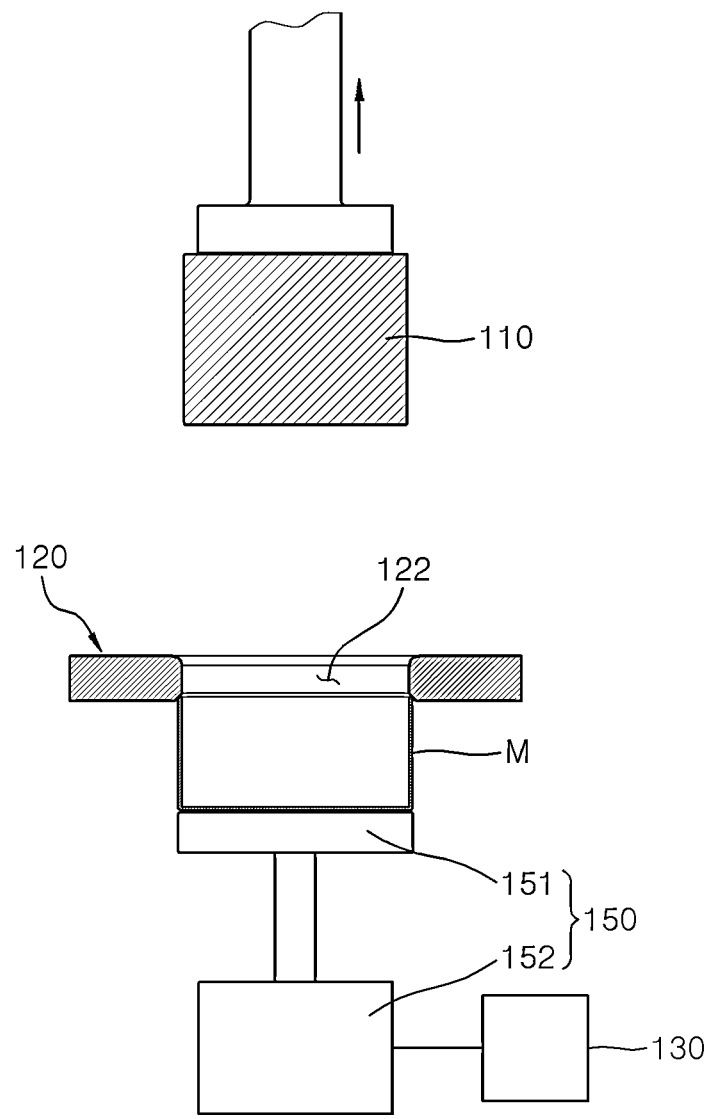
Figure 9:
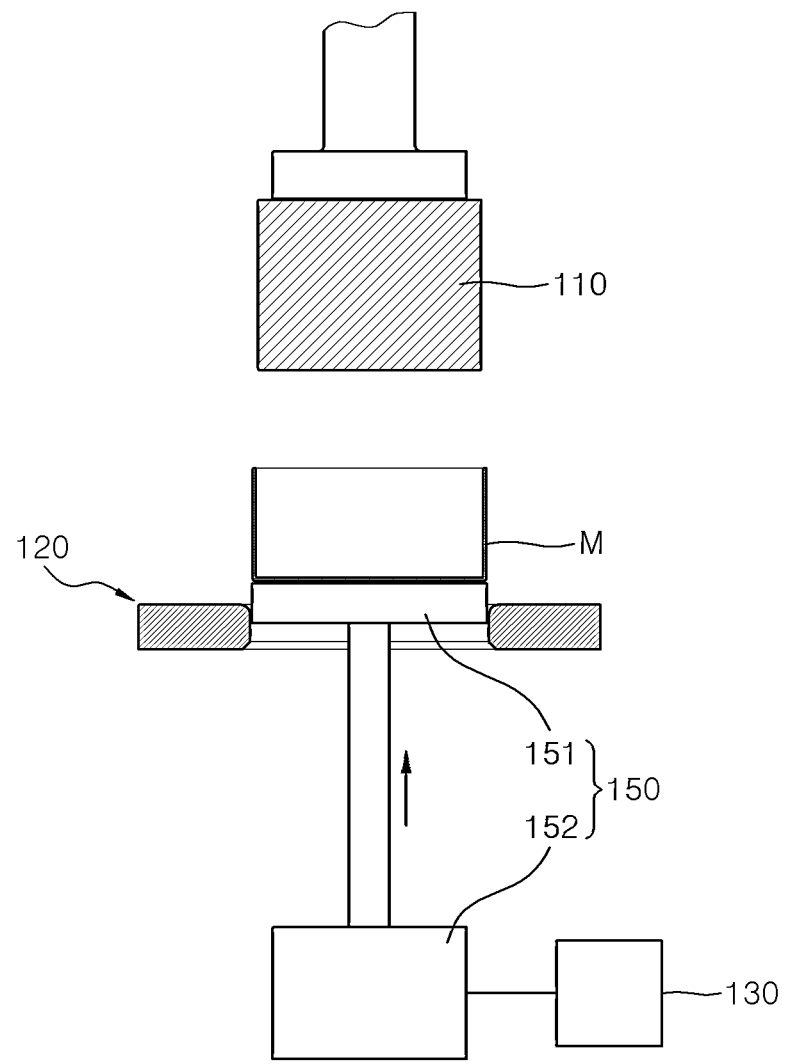

FIGS. 5 to 9 are views illustrating steps of a method for manufacturing a rechargeable battery case according to an embodiment of the present invention. Specifically, FIG. 5 is a view illustrating a state where an object is seated on a knockout unit, FIG. 6 is a view illustrating a state where an object is lowered by a punch, FIG. 7 is a view illustrating a state where a catching portion of a die comes in contact with an upper end of an object, FIG. 8 is a view illustrating a state where an object is separated from a punch and only the punch is raised, and FIG. 9 is a view illustrating a state where an object is discharged upwardly from a die.

First, referring to FIG. 5, in the step S110 (refer to FIG. 4) in which the object M is located on the knockout unit 150 that is located on the extrusion portion 122 of the die 120 by the transport unit 170, the object M that is processed in the previous process may be located on the support plate 151 by the transport unit 170 in a state where the support plate 151 of the knockout unit 150 is raised by the actuator 152 and is located to correspond to the die 120. In this case, the punch 110 starts to be lowered in a state where the object M is located on the knockout unit 150.

Next, referring to FIGS. 6 and 7, the step S120 (refer to FIG. 4), in which the object M is located so that the object M passes through the extrusion portion 122 and comes in contact with the catching portion 124 formed to be inclined on the lower side of the extrusion portion 122 as the punch 110 is inserted inside the object M and the punch 110 and the knockout unit 150 are lowered together, will be described. In the step S120 (refer to FIG. 4), the object M is lowered by the punch 110, and the lower end of the object M comes in contact with the guide portion 123. The guide portion 123 allows the object M to be naturally inserted into the extrusion portion 122.

Further, in the process in which the object M continues to be lowered by the punch 110, the gap between the object M and the extrusion portion 122 may be increased from D1 to D2. As the object M passes through the extrusion portion 122, the thickness of the object M may be changed to the value T due to the pressure between the die 120 and the extrusion portion 122. In this case, the controller 130 may lower the punch 110 until the upper end of the object M comes in contact with the catching portion 124 of the die 120.

Accordingly, as illustrated in FIG. 7, as the object M secedes from the extrusion portion 122, the width of the extrusion portion 122 may be reduced from D2 to D1, and the upper end of the object M may come in contact with the catching portion 124 of the die 120. Accordingly, the catching portion 124 may be located to interfere with one side of the upper end of the object M in up and down directions.

Next, referring to FIG. 8, the step S130 (refer to FIG. 4) in which the punch 110 is raised and is separated from the object M that is fixed by the catching portion 124 will be described. The controller 130 may control the driving unit 160 so that the punch 110 is raised in a state where the upper end of the object M comes in contact with the catching portion 124 of the die 120. In this case, the object M may be separated from the punch 110 by the catching portion 124, and the punch 110 may be raised independently.

Finally, as illustrated in FIG. 9, in the step S140 (refer to FIG. 4) in which the knockout unit 150 is raised and moves the object M upward through the extrusion portion 122, the controller 130 may control the knockout unit 150 so that the object M is raised after stopping the operation of the knockout unit 150 for a reference time.

Here, the reference time may be within the range of 1.0 to 1.5 seconds. If the reference time is less than 1.0 second, the knockout unit 150 may operate to raise the object M in a state where the punch 110 is not separated from the object M. In contrast, if the reference time exceeds 1.5 seconds, the time to proceed with the process is increased, and thus the productivity may be decreased.

However, since the reference time is within the range of 1.0 to 1.5 seconds as described above, the knockout unit 150 may operate in a state where the punch 110 and the object M may be sufficiently separated from each other, and the productivity may be prevented from being decreased.

Continuing to describe, the actuator 152 of the knockout unit 150 may be actuated to cause the support plate 151 to raise, and then the object M may be raised by the support plate 151 and disengaged from the catching portion 124 (refer to FIG. 3). The object M may sequentially pass through the extrusion portion 122 and the guide portion 123 and may be ejected upwardly from the die 120. Thereafter, the object M that is located on the knockout unit 150 may be withdrawn by a separate withdrawal unit (not illustrated).

It may be understood by those of ordinary skill in the art to which the present invention pertains that the present invention may be embodied in other specific forms without changing the technical idea or essential features of the present invention. Accordingly, it should be understood that the above-described embodiments are illustrative in all aspects, not restrictive. The scope of the present invention is defined by the appended claims to be described later rather than the above-described detailed description, and all changes or modifications derived from the meanings, scope, and equivalent concept of the claims should be interpreted as being included in the scope of the present invention.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. An apparatus for manufacturing a rechargeable battery case comprising:
   a punch configured to press an object;
   a die including an extrusion portion configured to extrude the object being pressed, the die being configured to be elastically deformed so that a width of the extrusion portion is increased when the punch presses the object such that the object enters the extrusion portion, and being configured to be elastically deformed so that the width of the extrusion portion is restored to an initial value when the punch continues to press the object such that the object secedes from the extrusion portion; and
   a knockout unit configured to be raised or lowered through the extrusion portion of the die, to seat the object seated thereon, to raise or lower the object, and to raise the object when the punch and the object are separated from each other by interference of the object with the die,
   wherein the die comprises:

a base portion having the extrusion portion formed to penetrate through the base portion in up and down directions;

a guide portion formed to be rounded on an upper side of a portion where the extrusion portion is located on the base portion and configured to guide the object to the extrusion portion; and a catching portion formed to be inclined on a lower side of a portion where the extrusion portion is located on the base portion and configured to restrict the object from moving to the extrusion portion when an external force over a specific magnitude is not applied to the object in a state where the catching portion comes in contact with an upper end of the object.

2. The apparatus of claim 1, wherein the catching portion is formed to have an angle within a range of 70 to 80 degrees with respect to a transverse direction of the base portion.

3. The apparatus of claim 1, wherein the object is drawn through the extrusion and has a thickness T, wherein the punch has a width P, wherein a width of the extrusion portion has an initial value D1 and when the object is positioned in the extrusion portion, the width of the extrusion portion increases to maximum D2, wherein the width P of the punch, the thickness T of the object that is drawn through the extrusion portion, and the initial value D1 of the width of the extrusion portion satisfy a mathematical expression below:

$$D1 < P + (T \times 2).$$

4. The apparatus of claim 1, wherein the object is drawn through the extrusion and has a thickness T, wherein the punch has a width P, wherein a width of the extrusion portion has an initial value D1 and when the object is positioned in the extrusion portion, the width of the extrusion portion increases to maximum D2, wherein a difference between the value D2 and D1 is in a range of 0.1 to 0.5 mm.

5. The apparatus of claim 1, further comprising:
a frame to which the die is coupled;
a drive configured to move the punch in up and down directions;
a controller configured to control operations of the knockout unit and the drive.

6. The apparatus of claim 5, further comprising:
an upper plate coupled to an upper portion of the die; and
a lower plate coupled to a lower portion of the die and coupled to the frame.

7. The apparatus of claim 5, wherein the controller is configured to lower the punch until an upper end of the object comes in contact with the catching portion of the die.

8. The apparatus of claim 7, wherein the controller is configured to control the knockout unit so that the object is raised after stopping an operation of the knockout unit for a reference time, while controlling the drive so that the punch is raised in a state where an upper end of the object comes in contact with the catching portion of the die.

9. The apparatus of claim 8, wherein the reference time is within a range of 1.0 to 1.5 seconds.

10. An apparatus for manufacturing a rechargeable battery case, which performs a drawing process at least once on an object having a three-dimensional shape with an open top to manufacture the rechargeable battery case, the apparatus comprising:

a punch;

a die provided with an extrusion portion and a catching portion formed to be inclined on a lower side of the extrusion portion; and a knockout unit on which the object is seated in a state where the knockout unit is raised to the extrusion portion, wherein the punch is lowered together with the knockout unit in a state where the punch is inserted inside the object such that the object passes through the extrusion portion and comes in contact with the catching portion, and then the punch is raised again alone in a state where the knockout unit is fixed such that the punch is separated from the object by the catching portion, and wherein the knockout unit is elevated after the punch and the object are separated from each other such that the knockout unit ejects the object upward through the extrusion portion, wherein the object is drawn through the extrusion and has a thickness T, wherein the punch has a width P, wherein a width of the extrusion portion has an initial value D1 and when the object is positioned in the extrusion portion, the width of the extrusion portion increases to maximum D2, wherein the width P of the punch, the thickness T of the object that is drawn through the extrusion portion, and the initial value D1 of the width of the extrusion portion satisfy a mathematical expression below:

$$D1 < P + (T \times 2).$$

11. A method for drawing an object having a three-dimensional shape with an open top, the method comprising:

positioning the object on a knockout unit that is disposed on an extrusion portion of a die by a transport unit;

locating the object so that the object passes through the extrusion portion and comes in contact with a catching portion formed to be inclined on a lower side of the extrusion portion by inserting a punch inside the object and lowering the punch and the knockout unit together;

separating the punch from the object that is fixed by the catching portion by raising the punch; and moving the object upward through the extrusion portion by elevating the knockout unit.

* * * * *